J. A. ST. CLAIR.
SAW GAGE.
APPLICATION FILED JULY 12, 1917.
1,250,694.
Patented Dec. 18, 1917.
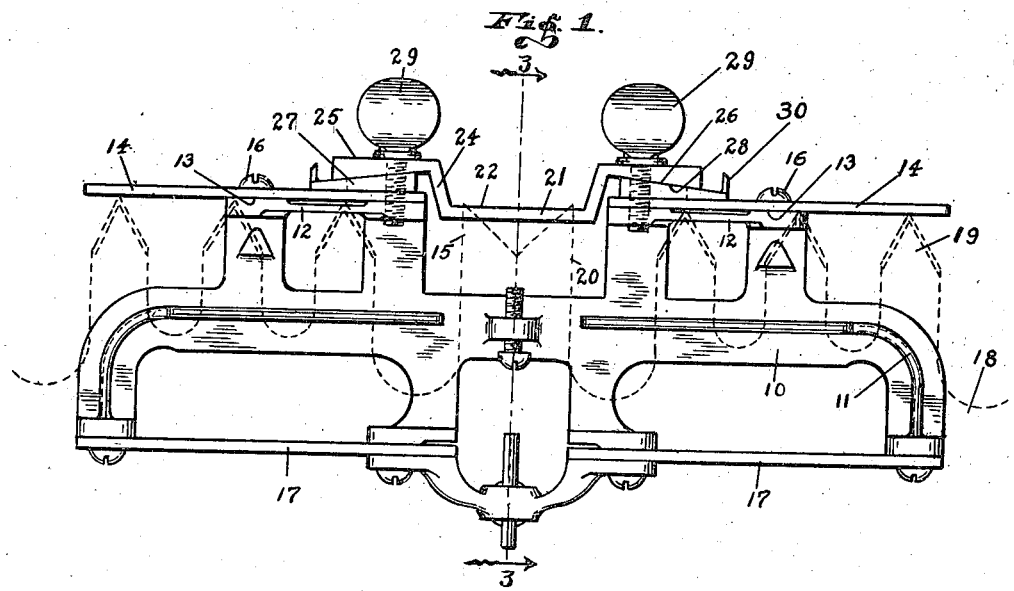
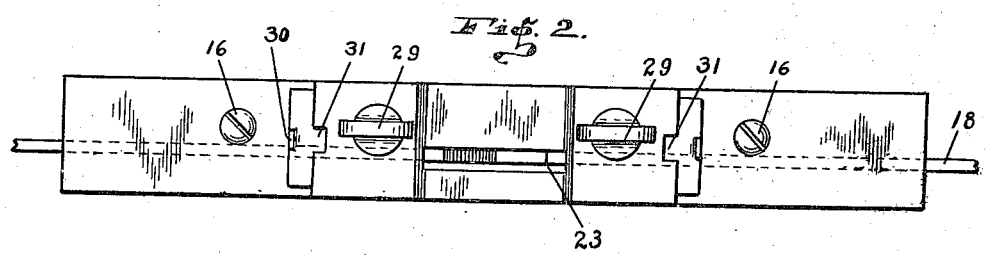
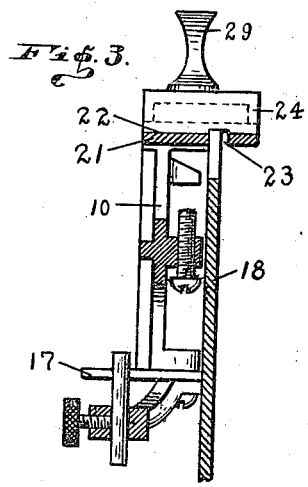
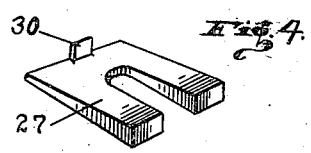
Inventor
John Alonzo St Clair,
Witness,
Odelaide Kearns.
By Hood & Schley.
Attorneys

UNITED STATES PATENT OFFICE.

JOHN ALONZO ST. CLAIR, OF INDIANAPOLIS, INDIANA, ASSIGNOR TO E. C. ATKINS & CO., OF INDIANAPOLIS, INDIANA, A CORPORATION OF INDIANA.

SAW-GAGE.

1,250,694.

Specification of Letters Patent.

Patented Dec. 18, 1917.

Application filed July 12, 1917. Serial No. 180,074.

*To all whom it may concern:*

Be it known that I, JOHN ALONZO ST. CLAIR, a citizen of the United States, residing at Indianapolis, in the county of Marion and State of Indiana, have invented a new and useful Saw-Gage, of which the following is a specification.

It is the object of my invention to provide a saw gage whereby the raking teeth of cross-cut saws may be accurately shortened by any desired amount relative to the cutting teeth, which amount may be varied easily, conveniently, and accurately as desired.

My present invention is an improvement on that shown in my prior Patent No. 1,187,936, granted June 20, 1916; and differs therefrom in that instead of using a gage plate having projections which are resilient and are bent by adjusting screws in order to obtain the desired adjustment, I use a gage plate which has projections coöperating with wedges which may be moved to produce the desired adjustment. The angle between the two surfaces of the wedge is less than the angle of slip, so that when the clamping screws are adjusted the parts are firmly held without slipping. By thus using wedges, I eliminate all distortion from bending.

The accompanying drawings illustrate my invention. Figure 1 is an elevation of a saw gage embodying my invention; Fig. 2 is a plan view of such saw gage; Fig. 3 is a section on the line 3—3 of Fig. 1; and Fig. 4 is a perspective view of one of the adjusting wedges.

The frame 10, which is conveniently cut away at various parts for lightness and is provided with ribs 11 for stiffening purposes, is provided along its upper edge with two horizontal flanges 12, the upper surfaces 13 of which are machined in the same plane and have mounted thereon two flat metal guide plates 14, which though separate practically form parts of a single guide plate. The adjacent ends of the guide plates 14, and also the adjacent ends of flanges 12, are spaced apart by a distance greater than the greatest width of raking tooth for which the saw gage is to be used, to provide a gap or space 15. The guide plates 14 are fastened to the flanges 12 by screws 16, and project forward beyond the edges of the flanges 12. These front edges of the flanges 12, and the corresponding edges of plates 17 fastened to the lower edge of the frame 10, serve as guides which bear against the side of the saw blade 18, and the under sides of the overhanging parts of the guide plates 14 serve as a guiding surface for the points of the cutting teeth 19 of the saw 18, interspersed among which cutting teeth 19 in any desired manner are raking teeth 20, which are to be shorter by a few thousandths of an inch, the amount varying for different conditions, than are the cutting teeth 19.

To provide for obtaining this shortening of the raking teeth, a gage plate 21 having a flat upper surface 22 is provided in the space 15. This plate 21 has a slot 23 in the plane of the saw 18, for receiving the saw teeth. By varying the relation between the upper surface 22 of the gage plate 21 and the under surface of the guide plates 14, the saw teeth may be made to project any desired distance through the slot 23 and above the gaging surface 22, so that when the raking teeth 20 thus project they may be filed off the distance they project. In order to support the gage plate 21 so that the position of its upper surface 22 may conveniently be varied, it is provided at its ends with upwardly extending portions 24 from the upper ends of which lateral projections 25 extend over the guide plates 14. The under surfaces 26 of the two projections 25 are oppositely inclined, at quite acute angles, with respect to the gaging surface 22. Beneath each projection 25 is a wedge 27, having its upper surface 28 inclined to correspond with the surface 26, which it engages, the under surface of the wedge 27 resting on the upper surface of the corresponding guide plate 14. A thumb screw 29 extends through each projection 25 and through a slot in the coöperating wedge 27 into a screw-threaded hole in the frame 10, for clamping the wedge 27 between the projection 25 and the guide plate 14. The inclination of the surfaces 26 and 28 is at a less angle than the angle of slip to the gaging surface 22 and to the upper surfaces of the guide plates 14, and the thick edges of the wedges 27 are toward the portions 24, so that such wedges will not drop out in case the thumb screws 29 become loose. Each wedge 27 at its thin or outer edge is provided with an upturned thumb piece 30, to facilitate handling the wedge, and the outer edge of each projection 25 may have a notch 31 for receiving this thumb piece when the wedge is shoved entirely in.

With the thumb screws 29 loosened, the wedges 27 may be set to any desired position, whereupon the thumb screws 29 may be tightened to clamp the parts in their corresponding relative positions. By changing the adjustment of the wedges 27, the distance between the planes of the gaging surface 22 and of the underfaces of the guide plates 14 may be varied as desired. When the gaging surface 22 is adjusted as desired, the raking teeth 20 are filed off flush with such surface, while the points of the cutting teeth bear against the under side or guiding surface of the guide plates 14. Any inaccuracy in machining, or any wear caused by any possible filing off of the gaging surface 22, may be compensated for by varying the setting of the wedges 27, though on account of the hardness of the plate 21 there is very little wearing off of such gaging surface.

I claim as my invention:

1. A saw gage, comprising a guide plate having a guiding surface for the cutting teeth of a cross-cut saw to abut against, a gage plate having a gaging surface on the opposite side from the saw and roughly in line with the guiding surface of said guiding plate, said gage plate having a projection which extends over said guide plate, a wedge between said projection and said guide plate, and a clamping screw for clamping said wedge between said projection and said guide plate, so that by varying the adjustment of said wedge the relative position of the gaging and guiding surfaces may be adjusted, the inner end of said wedge being the thick edge so that the wedge will not drop out in case the clamping screw becomes loose.

2. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in line with the guiding surface of said guiding plate, said gage plate having two opposite projections extending away from such gap, a wedge slidable under each of said projections and having its thick edge toward said gap, and a tightening screw acting on each projection for clamping it against the wedge, so that by loosening the screws and adjusting the wedges the relation of the gaging surface to the guiding surface may be varied.

In witness whereof, I have hereunto set my hand at Indianapolis, Indiana, this 9th day of July, A. D. one thousand nine hundred and seventeen.

JOHN ALONZO ST. CLAIR.

Witnesses:
M. A. POTTER,
H. W. TAYLOR.

Copies of this patent may be obtained for five cents each, by addressing the "Commissioner of Patents, Washington, D. C."